(12) United States Patent
Kusiak et al.

(10) Patent No.: US 8,388,022 B2
(45) Date of Patent: Mar. 5, 2013

(54) SUSPENSION RESTRAINT SYSTEM

(76) Inventors: Derek Paul Kusiak, Livonia, MI (US); Daniel Paul Colip, New Palestine, IN (US)

( * ) Notice: Subject to any disclaimer, the term of this patent is extended or adjusted under 35 U.S.C. 154(b) by 94 days.

(21) Appl. No.: 12/848,093

(22) Filed: Jul. 30, 2010

(65) Prior Publication Data

US 2011/0027009 A1 Feb. 3, 2011

Related U.S. Application Data (60) Provisional application No. 61/230,687, filed on Jul. 31, 2009.

(51) Int. Cl.
*B62D 63/04* (2006.01)
*B60R 99/00* (2009.01)
(52) U.S. Cl. .................................... 280/754
(58) Field of Classification Search .............. 280/5.507, 280/5.513, 5.515, 124.101, 124.102, 124.135, 280/754, 755; 267/64.12, 66, 67, 68, 197; 188/190, 300; 180/311, 312, 313
See application file for complete search history.

(56) References Cited

U.S. PATENT DOCUMENTS

| | | | | |
|---|---|---|---|---|
| 4,078,779 | A | * | 3/1978 | Molders ......................... 267/120 |
| 4,309,027 | A | * | 1/1982 | Molders et al. ................ 267/124 |
| 4,449,702 | A | * | 5/1984 | Hasegawa ................... 267/64.12 |
| 4,572,534 | A | * | 2/1986 | Heyl ............................. 280/276 |
| 4,723,765 | A | * | 2/1988 | Pearson ..................... 267/64.12 |
| 4,735,276 | A | * | 4/1988 | Burton ......................... 180/219 |
| 5,044,592 | A | * | 9/1991 | Cienfuegos ................... 248/408 |
| 7,051,852 | B2 |   | 5/2006 | Maret |

OTHER PUBLICATIONS

Quadshot starting device. Idol Speed website [online].[Retrieved on Jun. 27, 2010]. Retrieved form the Internet:<URL: http://web.archive.org/web/20100627054422/http://www.idolspeed.com/>.*
Google Search Return. Google Search [online]. [Retrieved on Dec. 17, 2011]. Retrieved from the Internet: <URL: http://www.google.com/webhp?hl=en#q=idol+speed+quad+shot&hl=en&prmd=imvns&sa=X&ei=aXHsTp7oN-Lf0QHwmYimCQ&ved=0CA8QpwUoBg&source=lnt&tbs=cdr:1%2Ccd_min%3A1%2F1%2F2001%2Ccd_max%3A12%2F12%2F2008&tbm=&bav=on.2,or.r_gc.r_pw.,cf.osb&fp=dc9>.*

* cited by examiner

*Primary Examiner* — Drew Brown
*Assistant Examiner* — Barry Gooden, Jr.
(74) *Attorney, Agent, or Firm* — Mastrogiacomo PLLC (57) ABSTRACT

A suspension restraint system for an All Terrain Vehicle (ATV) includes a clamp fixed to at least one control arm of a suspension system, the clamp including a post, a rod mount fixed to a frame member, a rod configured to be secured to the rod mount, the rod including a hook, the hook being configured to engage the post of the clamp. The rod is configured to engage said clamp and restrain a movement of the suspension system when the suspension system is in a lowered position relative to the frame member.

14 Claims, 9 Drawing Sheets

SUSPENSION RESTRAINT SYSTEM

CROSS REFERENCE TO RELATED APPLICATIONS

This patent application claims the benefit of priority based on U.S. Provisional Patent Application No. 61/230,687 filed on Jul. 31, 2009, which is incorporated by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to all terrain vehicles (ATVs) and, more particularly, to a suspension restraint system used to lower and temporarily lock the suspension at a set location for the start or "hole shot" of an ATV race.

2. Background Art

The sport of All Terrain Vehicle (ATV) Racing is becoming increasingly popular across the United States and throughout the world. ATV or "Quad" racing is the four-wheel form of the ever popular two-wheel motorcycle motocross races that are run throughout the world. A typical ATV race is run on an off-road course and involves a number of turns and jumps that a rider must negotiate to win the race. Riders generally race against one another through the course at the same time. The different race opponents will line up their ATVs across the start line and start the race when given the signal. Often a race may be won or lost at the start. Riders begin the race with what is known as the "hole shot", meaning the riders may apply full throttle at the start to propel their ATV forward. Those doing so the fastest typically gain the advantage as the race leader.

While the goal of the hole shot is to accelerate the ATV as quickly as possible off the start line, often the sudden acceleration from a standing stop will tend to lift the front wheels of the ATV off the ground resulting in a decrease of acceleration and possible loss of position in the race to competitors. A loss in acceleration and subsequent loss in speed may mean the difference between winning and losing the race.

U.S. Pat. No. 7,051,852 entitled "Suspension Restraint Devices" offers a solution for motorcycles or two wheel vehicles. U.S. Pat. No. 7,051,852 provides a post member that interacts with a stop member on the front fork of a motorcycle to temporarily compress a shock absorber and lock the front end of the motorcycle in a lower position for the start of the race or hole shot. The lower position of the front of the motorcycle will aid in keeping the front wheel in contact with the ground and allow the motorcycle to accelerate quickly and smoothly. While this solution has been proven to work well with two-wheeled motorcycles, the solution, however, has not been proven to work well with the more complex suspension systems of ATVs or four-wheeled quad-runners.

Therefore, a need exists for a suspension restraint system that is capable of temporarily compressing and locking a shock absorber in a lower position. This will, in turn, position the front end of the ATV in a lowered position. By maintaining a lowered front end at the start of the race, the wheels of the ATV may stay in contact with the ground for the duration of the start to help ensure that a constant acceleration may be maintained throughout the hole shot to propel the ATV and rider forward in the hopes of leading the race from the beginning.

BRIEF SUMMARY OF THE INVENTION

A suspension restraint system for an All Terrain Vehicle (ATV) is provided and includes a clamp fixed to at least one control arm of a suspension system, the clamp including a post, a rod mount fixed to a frame member, a rod configured to be secured to the rod mount, the rod including a hook, the hook being configured to engage the post of the clamp. The rod is configured to engage said clamp and restrain a movement of the suspension system when the suspension system is in a lowered position relative to the frame member.

BRIEF DESCRIPTION OF THE SEVERAL VIEWS OF THE DRAWINGS

The features and inventive aspects of the present invention will become more apparent from the following detailed description, claims, and drawings, of which the following is a brief description:

DETAILED DESCRIPTION OF THE INVENTION

Referring now to the drawings, a preferred illustrative embodiment of the present invention is shown in detail.

Although the drawings represent an embodiment of the present invention, the drawings are not necessarily to scale and certain features may be exaggerated to better illustrate and explain the present invention. Further, the embodiment set forth herein is not intended to be exhaustive or otherwise to limit or restrict the invention to the precise forms and configurations shown in the drawings and disclosed in the following detailed description.

Quad-Runners or Four-Wheelers have long been used for travel across many types of terrain from paved roads to dirt trails, sand dunes, and the like. These vehicles are used for both work purposes and relaxation. Because these vehicles are able to travel across the many types of terrain they are commonly known as All Terrain Vehicles or ATVs. The suspension systems of ATVs are also well designed to handle the different terrains a rider may encounter. The suspension systems typically consist of a shock absorber and spring assembly that may be connected between the main body frame and the front wheel frame of the ATV (see e.g. FIGS. 1A and 1B). As an ATV is ridden through the rough terrain of dirt tracks, the ATV will encounter a number of bumps, ruts, holes and the like. As an ATV encounters a bump, the force of the subsequent landing will be absorbed by the ATV and ultimately the driver if the suspension system is not in place. The force may be such that the main frame and front wheel frame may be damaged and the rider may be injured. Suspension systems have been designed and implemented to absorb and dissipate the energy that may be transferred from the rough terrain to the frame of the ATV and ultimately the rider. This system acts to limit the damage to the ATV and to provide a safer ride for the rider as well.

Just as with motorcycles, owners of four-wheelers or ATVs enjoying competitive racing. While motorcycle racing has been popular throughout the world for a number years, the popularity of ATV racing has grown only recently. Much of the competitive racing involving ATVs takes place on dirt tracks or "off road". As discussed above the suspension systems for ATVs may be designed to handle this type of off road racing.

Figure 1A:
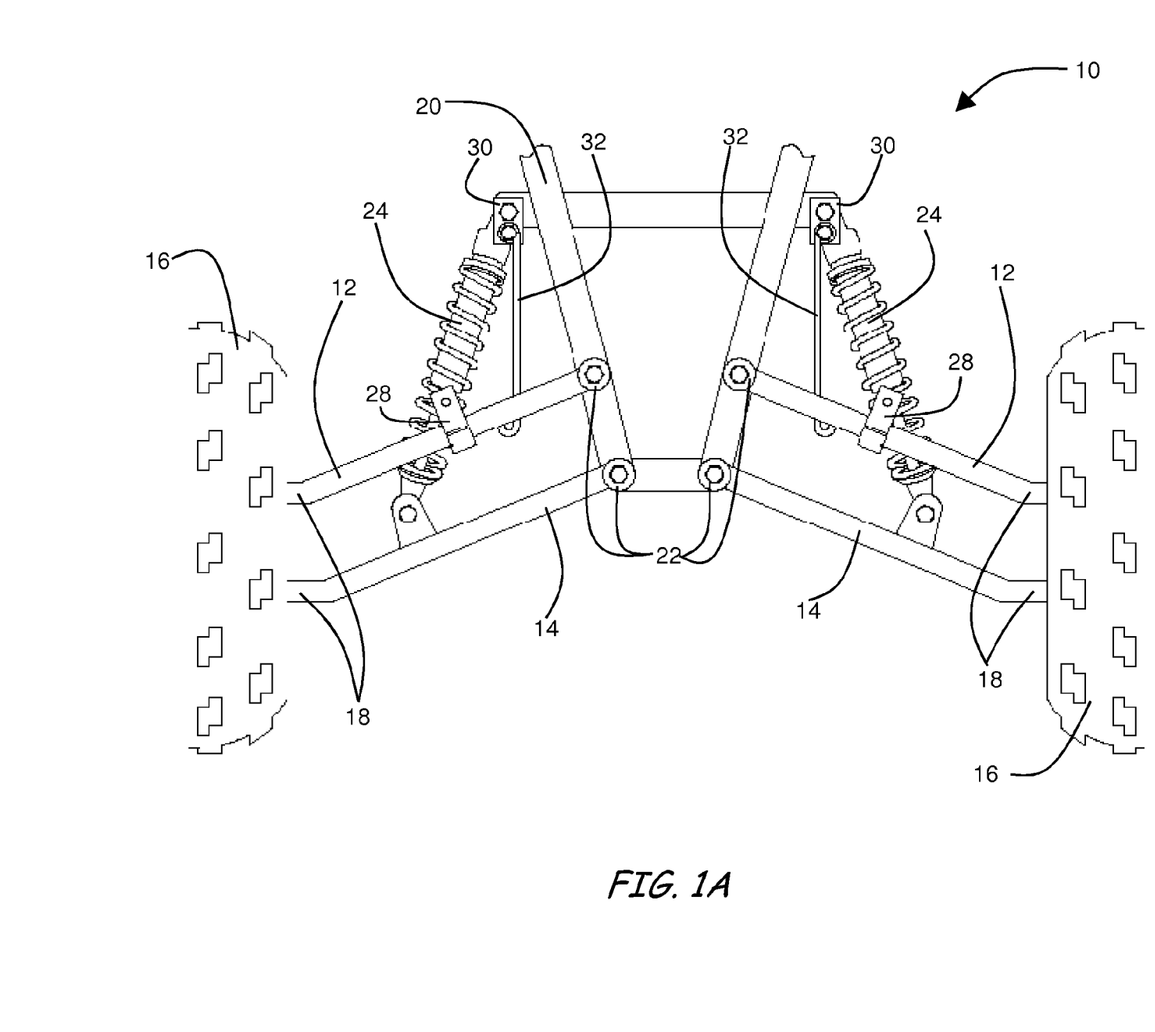
FIGS. 1A and 1B are front views of a front end of an ATV and of a suspension restraint system illustrating the suspension restraint system disengaged (FIG. 1A) and engaged (FIG. 1B) according to an embodiment of the present invention.
Figure 1B:
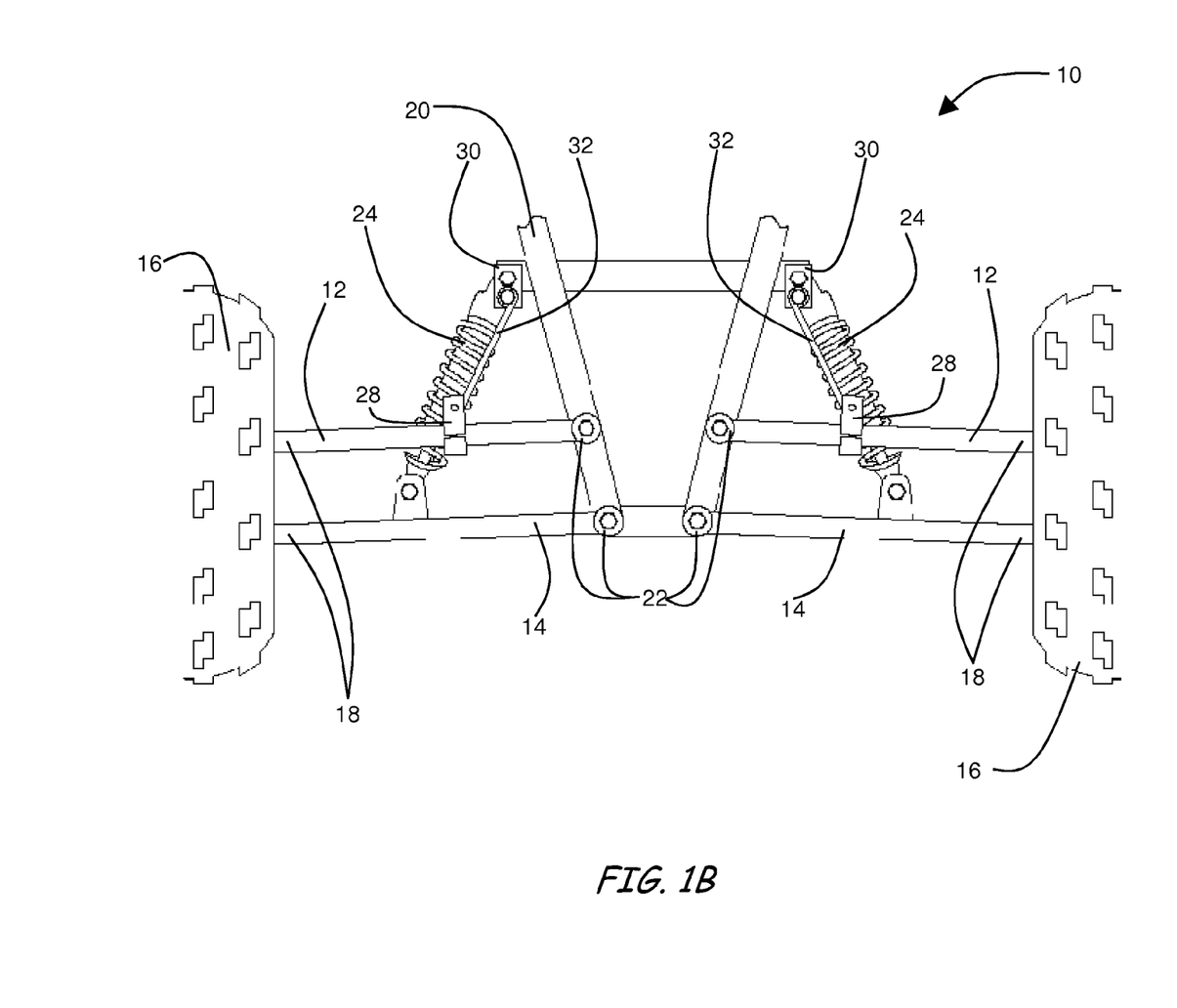

Now referring to FIGS. 1A and 1B, a front end of an ATV is illustrated. The front end is shown to illustrate a suspension system 10 of an ATV. Suspension system 10 includes a pair of upper arms 12 and lower arms 14 each of which are connected to tires 16 at first ends 18. Upper arms 12 and lower arms 14 are connected to a frame member 20 at second ends 22. Second ends 22 are secured to frame member 20 such that upper arms 12 and lower arms 14 are able to move freely up and down with respect to frame member 20. This freedom of movement allows tires 16 to move independently of one another such that the tires are able to follow the terrain and maintain contact and ultimately traction with the ground. By maintaining contact and traction between the tires of the ATV and the ground, the rider and ATV are able to accelerate quickly and maintain a top speed during a competitive race.

Suspension system 10 also includes a pair of shocks 24 that are connected to frame member 20 and lower arms 14. As stated above, shocks 24 work in conjunction with suspension system 10 to absorb or dampen the impact to the ATV when encountering bumps, holes or other rough terrain throughout a course that will cause tires 16 to jostle and force upper arms 12 and lower arms 14 to move up and down with respect to frame member 20.

Now referring also to FIGS. 2A-4B, a suspension restraint system 26 is provided according to an embodiment of the present invention. During a race, in order to maintain acceleration and a top speed, the rider of the ATV would desire to keep the tires of the ATV in contact with the ground and terrain as much as possible to gain the most possible traction. Maintaining contact with the ground and terrain is very important at the start of a race or "hole-shot." A rider desires to maintain maximum contact between the tires of the ATV and the ground and therefore, maximize traction which in turn results in maximum acceleration and speed and a winning ride. The rider also wants to maintain as low a profile as possible to limit air resistance as the ATV is propelled forward. Suspension restraint system 26 may aid the ATV in maintaining maximum contact between the tires of the ATV and the racing surface and helping to ensure that the ATV and rider stay as low as possible to limit air resistance. Suspension restraint system 26 will also operate equally as well on any ATV with a rear wheel drive system, a front wheel drive system or an all wheel drive system. As stated above, the suspension system is used on the ATV to aid the tires of the ATV in maintaining contact with the racing surface.

As discussed above, shocks 24 have been added to absorb or dampen the sudden movements of the suspension that occur when a hole or bump is encountered by a tire. The drawback of shocks 24 may be encountered at the start of a race or the hole shot. Shocks 24 are generally configured to absorb the impact to the ATV form the holes and bumps of the racing surface the ATV and rider will encounter along the race route. Therefore, shocks 24 may be configured to allow upper arms 12 and lower arms 14 to travel easily upward and downward with respect to frame 20 for a cushioned or 'soft' ride. Because shocks 24 allow upper arms 12 and lower arms 14 to travel upward and downward easily, the shocks of the ATV may not be configured for a standing start or a start from a stopped position. The torque sent to the wheels to propel the ATV forward from a stopped position may cause the ATV to lift the two front wheels off the ground or "pop a wheely", thus causing the front tires to lose contact with the racing surface and traction and ultimately resulting in a loss of acceleration and speed.

Figure 2A:
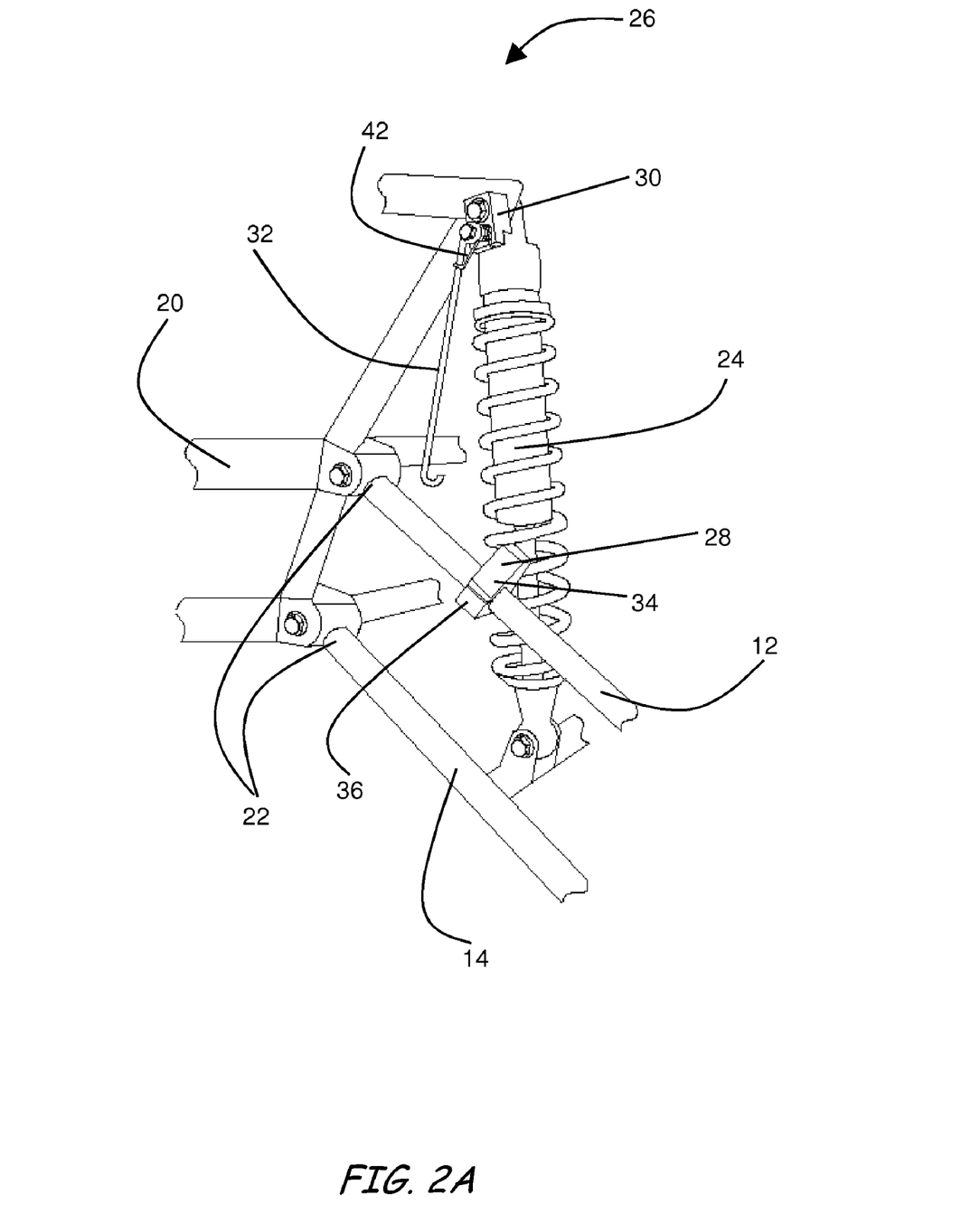
FIGS. 2A and 2B are perspective views of one side of the suspension restraint system illustrating the suspension restraint system disengaged (FIG. 2A) and engaged (FIG. 2B) according to an embodiment of the present invention.
Figure 2B:
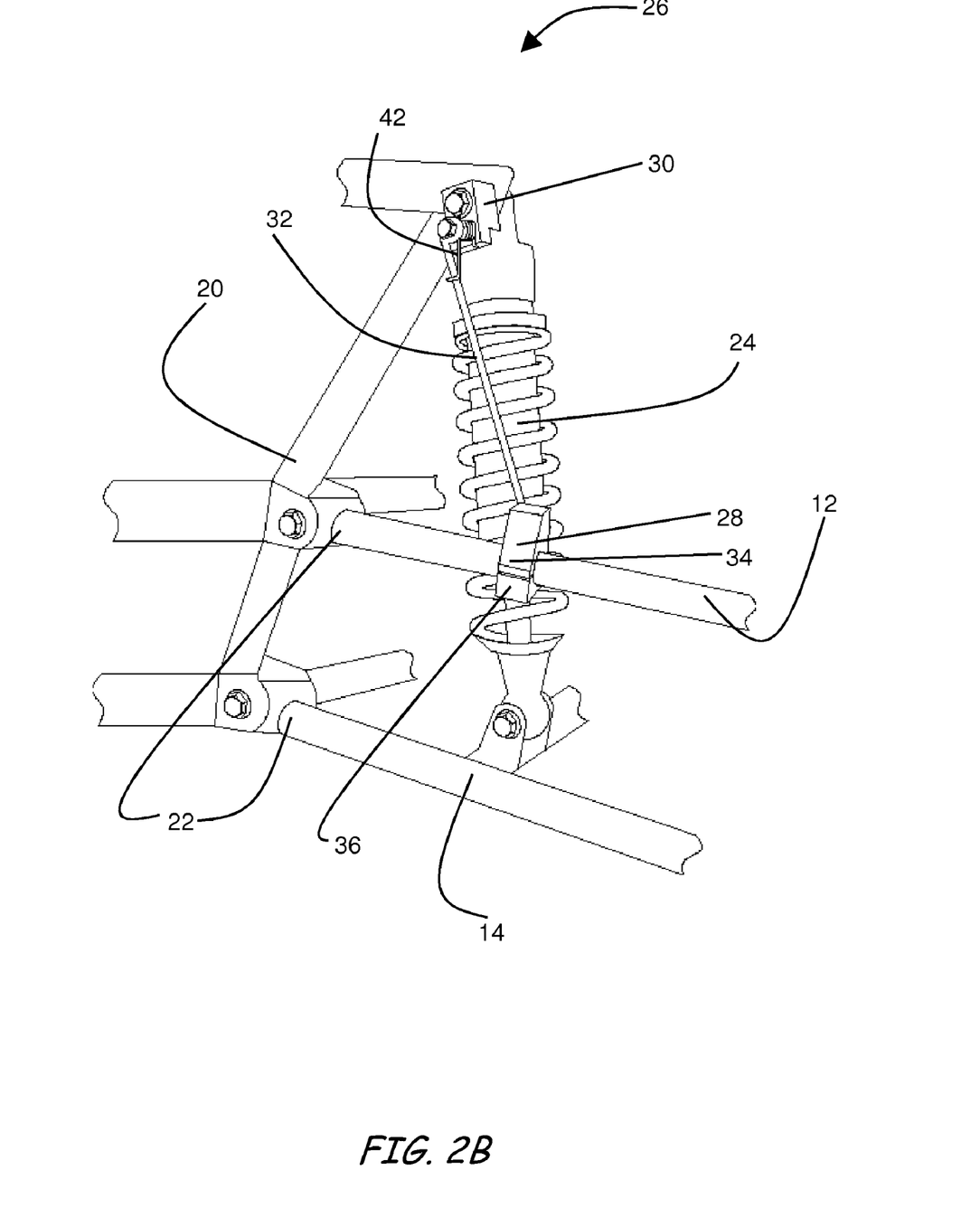

When engaged, as illustrated in FIGS. 1B and 2B, suspension restraint system 26 will restrain or lock suspension system 10 of the ATV in a position that will compress shocks 24 and lower the front end of the ATV. The compressed shocks 24 along with the lower front end of the ATV will help tires 16 to maintain contact with the racing surface during the start of the race or the hole shot. Suspension restraint system 26, when engaged, acts to lower the center of gravity of the ATV, thereby aiding the ATV to resist lifting the front tires off the ground and to maintain traction when torque is applied to the rear wheels at the start of a race.

The components of suspension restraint system 26 are illustrated in FIGS. 3A-3F and include a clamp 28 that may be attached to upper arms 12, a rod mount 30 that may be attached to frame member 20 and a rod 32. Clamp 28 may include an upper block 34 and a lower block 36. Upper block 34 may include at least one tapped hole 60 for accepting the threads of a fastener. Lower block 36 may include at least one hole 62 such that when upper block and lower block are positioned in a manner to align the tapped hole of upper block 34 with hole of lower block 36, a fastener may be used to assemble upper block 34 to lower block 36. Preferably two holes and tapped holes will be used along with two fasteners to adequately secure upper block 34 to lower block 36. When assembled, upper block 34 and lower block 36 are configured such that a hole 38 is formed. Hole 38 may be sized to capture upper arm 12 between upper block 34 and lower block 36 of clamp 28. The fasteners securing upper block 34 to lower block 36 may be tightened in a manner and with enough force such that clamp 28 may be secured to upper arm 12.

Figures 3A, 3B:
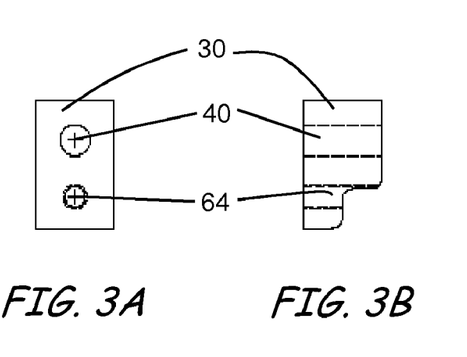
FIG. 3A is a front view of a rod mount of the suspension restraint system according to an embodiment of the present invention.
FIG. 3B is a side view of a rod mount of the suspension restraint system according to an embodiment of the present invention.

Rod mount 30 includes a first hole 40 that may be sized to accept a fastener so that rod mount 30 may be attached and secured to frame 20. Rod mount may also include a second hole 64 that may be sized and threaded to accept a second fastener to secure rod 32, through a loop 44, to rod mount 30, thereby securing rod 32 to frame member 20. Rod 32 may be secured to rod mount 30 such that rod 32 may swing freely about the second fastener and rod mount 30. A first end of a spring 42 may be positioned at the second fastener and secured to rod mount 30 and a second end may be attached to rod 32. Spring 42 will maintain rod 32 in a general location while the ATV is in motion so that rod 32 may not swing wildly into other components.

Figures 3C, 3D:
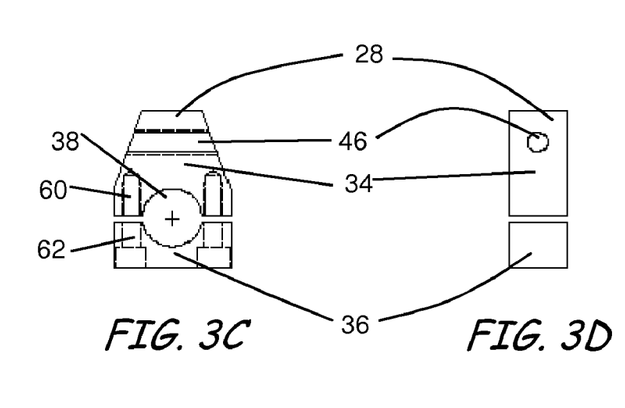
FIG. 3C is a front view of a clamp of the suspension restraint system according to an embodiment of the present invention.
FIG. 3D is a side view of a clamp of the suspension restraint system according to an embodiment of the present invention.
Figure 3E:
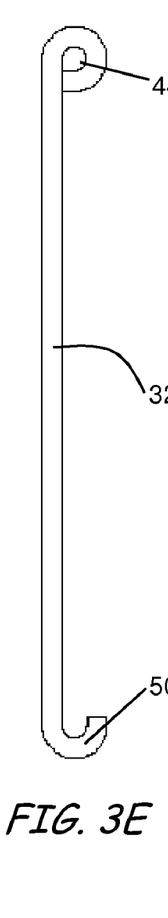
FIG. 3E is a front view of a rod of the suspension restraint system according to an embodiment of the present invention.
Figure 3F:
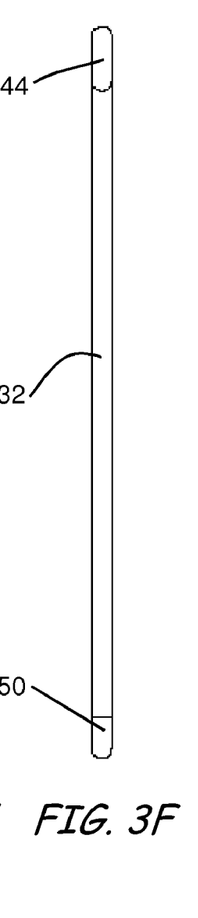
FIG. 3F is a side view of a rod of the suspension restraint system according to an embodiment of the present invention.
Figure 4A:
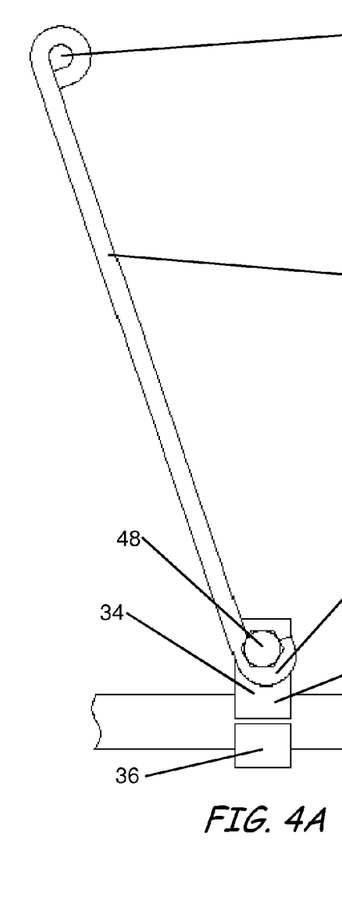
FIG. 4A is a rear view of the suspension restraint system according to an embodiment of the present invention.
Figure 4B:
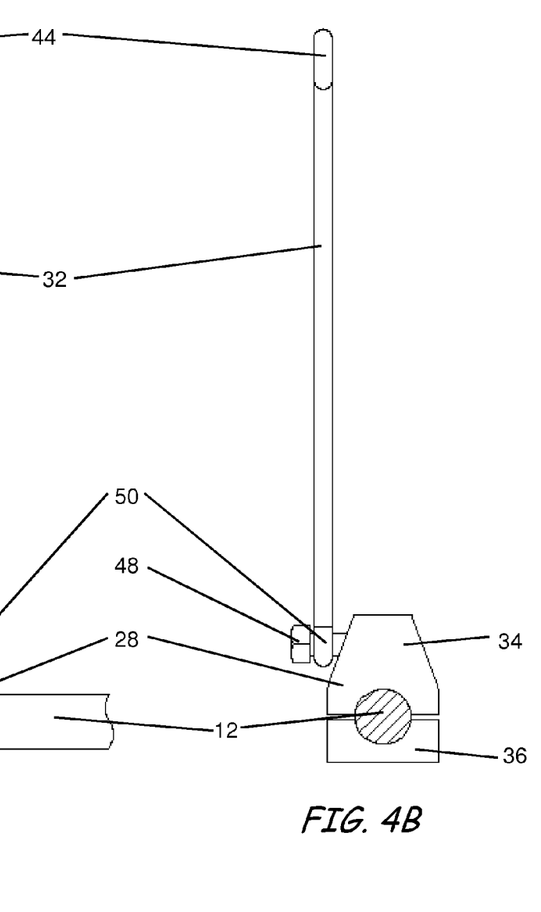
FIG. 4B is a side view of the suspension restraint system according to an embodiment of the present invention.
Figure 5A:
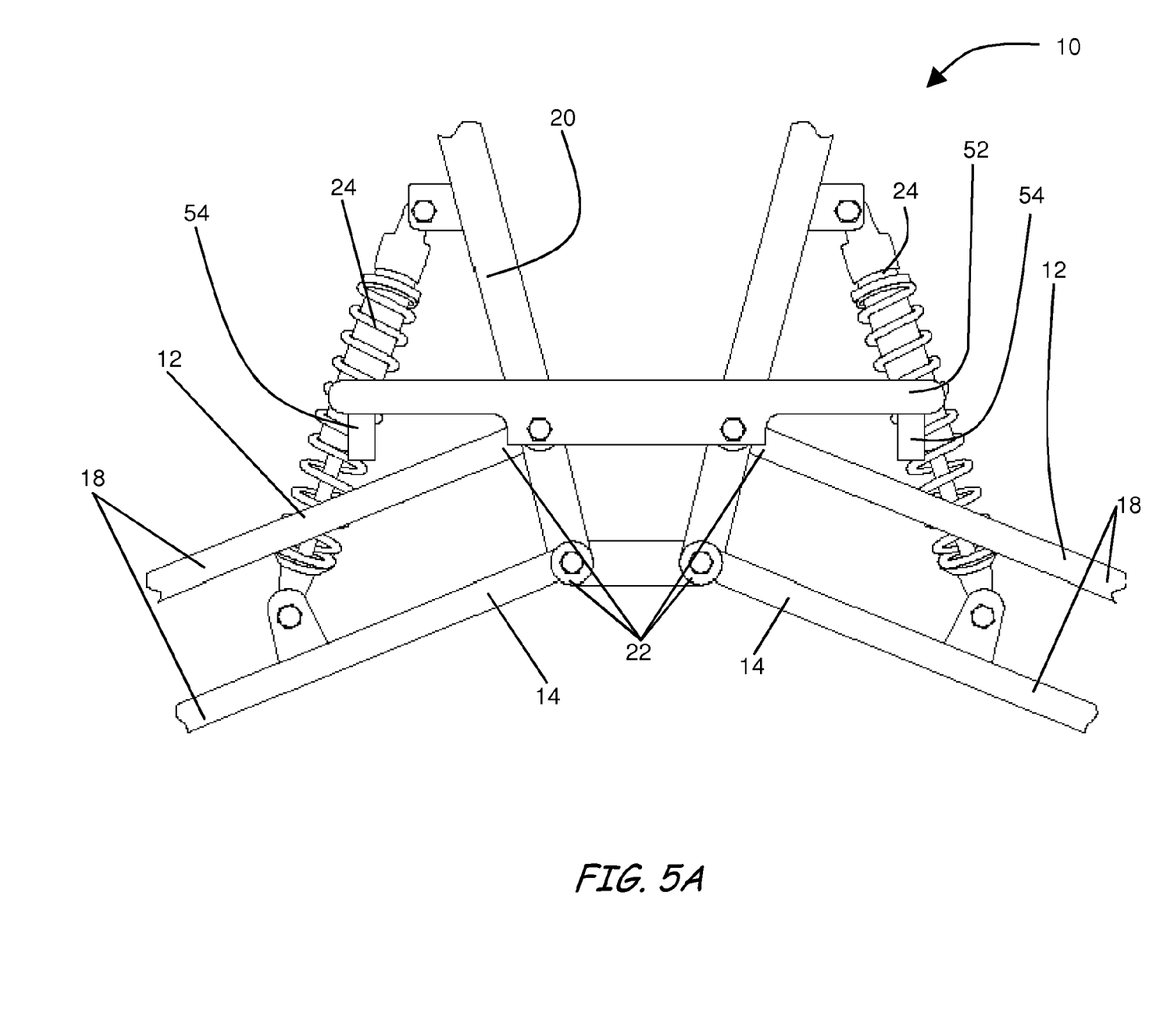
FIGS. 5A and 5B are front views of a front end of an ATV and of a suspension restraint system illustrating the suspension restraint system disengaged (FIG. 5A) and engaged (FIG. 5B) according to another embodiment of the present invention.
Figure 5B:
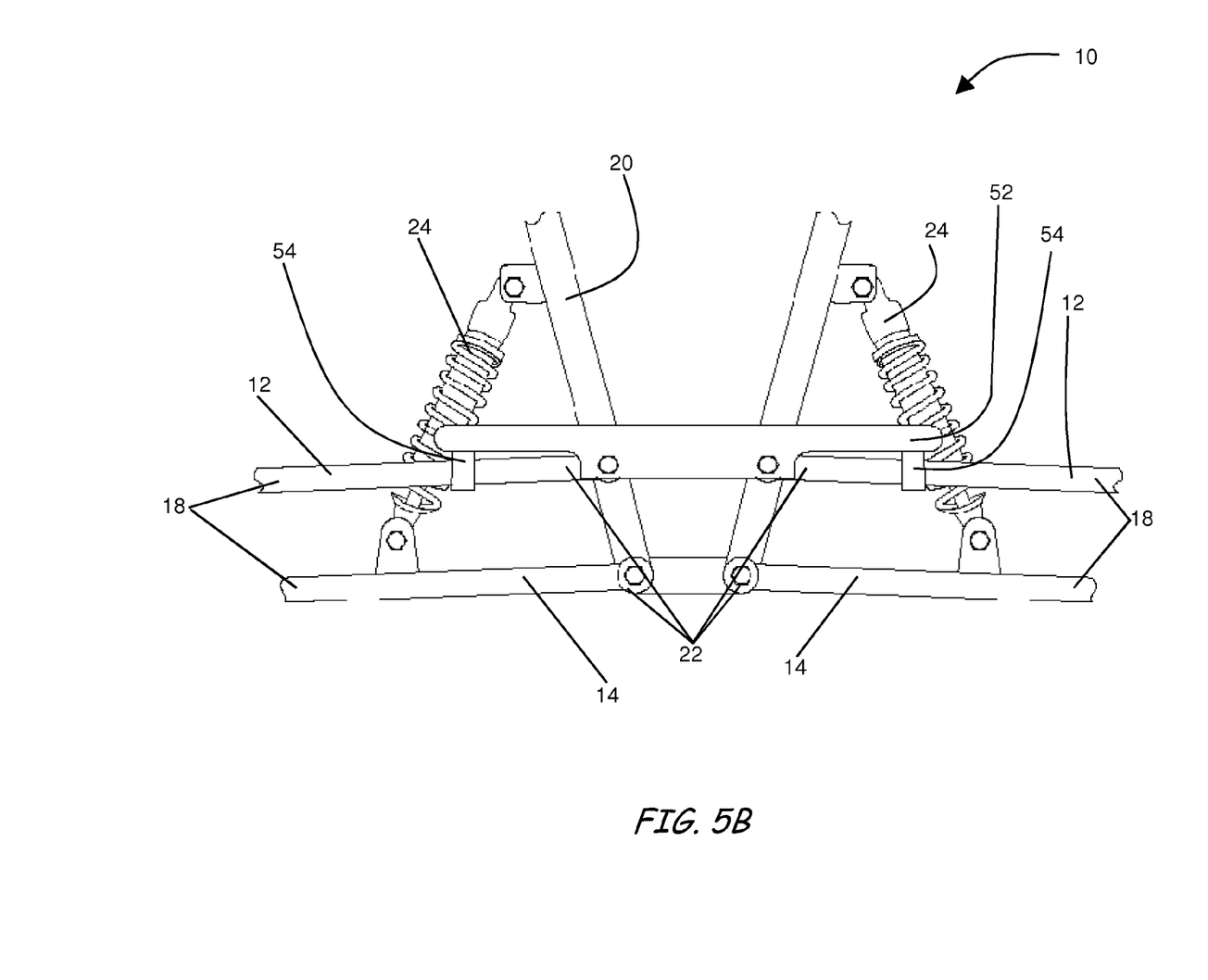
Figure 5C:
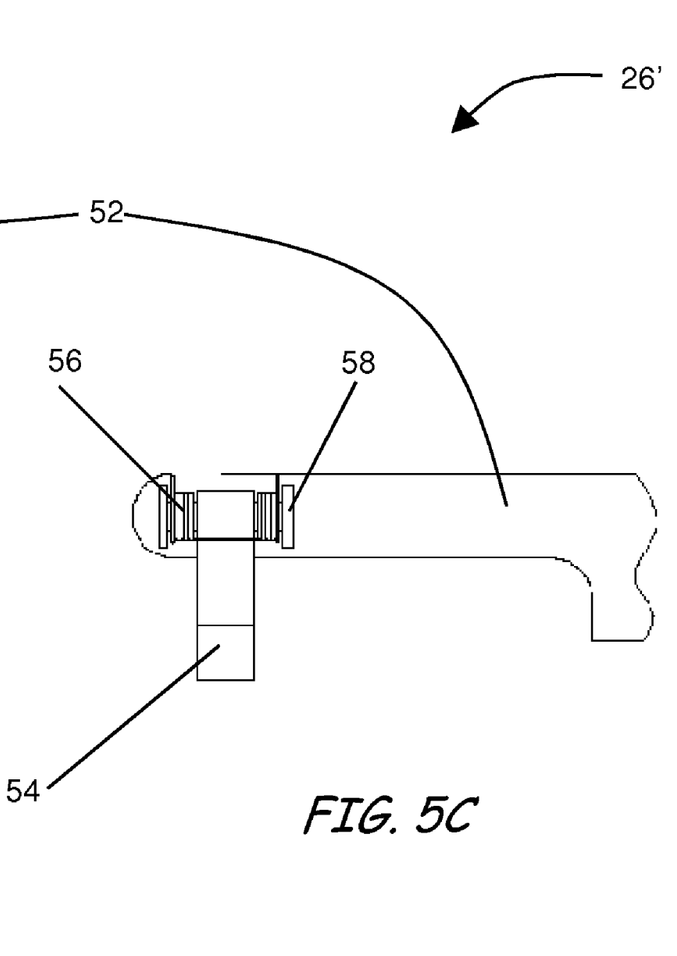
FIG. 5C is a rear view of the suspension restraint system according to another embodiment of the present invention.
Figure 5D:
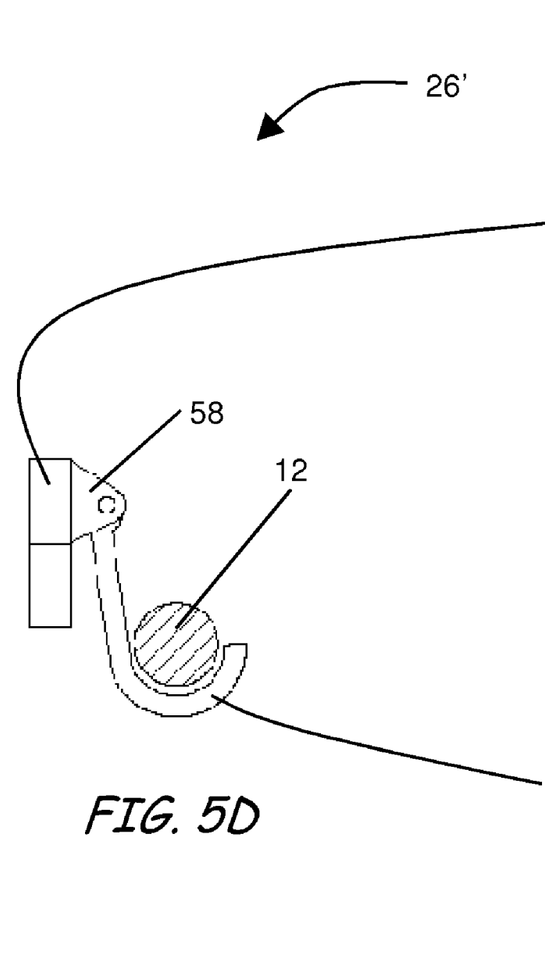
FIG. 5D is a side view of the suspension restraint system according to another embodiment of the present invention.

Clamp 28 may also include a second hole 46 as shown in FIGS. 3C and 3D, and may be sized to accept a post 48 or sized and tapped for accepting a threaded fastener. Post 48 may be configured to capture a hook 50 of rod 32 when suspension restraint system 26 is engaged (see FIGS. 4A and 4B).

Alternatively, clamp 28 may also be assembled to each of lower arms 14 (not shown) to allow the rider to select another possible setting for engagement of suspension restraint system 26. Clamps 28 may also be positioned anywhere along upper arms 12 and lower arms 14 simply by loosening fasteners and allowing clamps 28 to slide about upper and lower arms 12 and 14 until the desired location is attained. The fasteners may then be retightened to secure clamps 28 at the selected location on upper or lower arms 12 or 14. The ability to move clamps 28 between upper arms 12 and lower arms 14 as well as along the length of arms 12 and 14 will allow rider to configure suspension restraint system 26 to an optimal setting for a particular terrain.

Each of clamps 28, rod mounts 30, rod 32, spring 42 and related fasteners may be manufactured of any material including, but not limited to any type of metal such as steel, aluminum and the like, a composite material such as plastic, a ceramic material, etc. Preferably, the above components may be manufactured of a material with adequate strength to withstand the forces experienced by the ATV without failing and a material that is easily manufactured using any number of constructional techniques such as machining metal, molding or extruding plastic, casting ceramic materials and other like techniques depending on the material in use.

Suspension restraint system 26 may be engaged in the following manner. With clamp 28, rod mount 30 and rod 32 position and secured on the ATV, the rider, or another, may compress shocks 24 by pushing down on the front end of the ATV to such a point where upper arms 14 are positioned to allow hook 50 of each of rods 32 to engage post 48 of each of clamps 28. Each of rods 32 may be swung to a position such hook 50 will engage post 48 of each of clamps 28 to hold shocks 24 in a compressed position and secure suspension system 10 in a lower position until suspension restraint system 26 is released. The opposite, generally upward force supplied by shocks 24 to resist compression will act to ensure that hook 50 stays engaged with post 48 until the rider intends to disengage suspension restraint system 26.

Suspension restraint system 26 may be disengaged in a similar manner. The front end of the ATV may be pushed down once again and shocks 24 compressed to such a point where hook 50 will disengage from post 48. This may be done manually by the driver or another standing at the front of the ATV and pushing downward on frame member 20. Alternatively, disengagement may occur while riding the ATV during a race by depressing the brake. The forward momentum of the rider during braking will tend to force the front end of the ATV downward thereby compressing shocks 24 to a point that will allow hook 50 to disengage from post 48. Disengagement in this manner will allow shocks 24 to operate normally, to dampen the forces of the uneven terrain for the ATV and rider, for the remainder of the ride or race. Other means to disengage suspension restraint system 26 may include the rider pushing down on the front end of the ATV while riding the vehicle or encountering a hole or bump that may force shocks 24 to compress to a point of disengagement of hook 50 from post 48.

The force used to disengage hook 50 from post 48 may be adjusted by increasing the size of hook 50 of rod 32 such that a greater force may be needed for hook 50 to release from post 48. A greater or lesser force requirement for disengagement may be advantageous for the rider so that suspension restraint system 26 may be adapted to any type of ground surface or terrain.

FIGS. 5A-5D illustrate another embodiment of the present invention. In this particular embodiment of the present invention, suspension restraint system 26' includes a bar assembly 52 that may be secured to frame member 20 at upper arm 12. Bar assembly 52 includes at least one j-hook 54 and at least one spring 56. In this particular embodiment, two j-hooks 54 are used and are secured to each end of bar assembly 52 at tabs 58. J-hooks 54 may be secured to tabs 58 in such a manner that allows j-hooks 54 to pivot fore and aft about bar assembly 52. The fore and aft motion of j-hooks 54 about bar assembly 52 allow j-hooks to be moved into and out of the path of upper arms 12 as arms 12 travel up and down with respect to frame 20. Spring 56 may be used to bias j-hooks 54 to the front of bar assembly 52 to help ensure that j-hooks 54 remain out of the path of upper arms 14 when there is no desire to engage suspension restraint system 26' or when there is a desire to disengage suspension restraint system 26'.

In much the same manner as described above for suspension restraint system 26, suspension restraint system 26' may be engaged by pushing down on the front end of the ATV to a point where shocks 24 are compressed such that j-hooks 54 may be pivoted forward to engage upper arms 12 thereby locking restraint system 26' in position. Also, as described above, suspension restraint system 26' may be disengaged by forcing the front end of the ATV downward such that j-hooks 54 will release upper arms 14 and allow shocks 24 to expand to the normal position. The front end of the ATV may be forced downward manually, through braking or encountering a hole or bump. Also, as discussed above, the mounting location of bar assembly 52 may be moved to a lower portion of frame 20 such that lower arms 14 may be used rather than upper arms 12. The size of j-hooks 54 may also be modified to suit the riders need for a particular race to either increase or decrease the amount of force required for engagement and disengagement of system 26'.

The present invention has been particularly shown and described with reference to the foregoing embodiment, which is merely illustrative of the best modes presently known for carrying out the invention. It should be understood by those skilled in the art that various alternatives to the embodiment of the invention described herein may be employed in practicing the invention without departing from the spirit and scope of the invention as defined in the following claims. It is intended that the following claims define the scope of the invention and that the method within the scope of these claims and their equivalents be covered thereby. This description of the invention should be understood to include all novel and non-obvious combination of elements described herein, and claims may be presented in this or a later application to any novel non-obvious combination of these elements. Moreover, the foregoing embodiment is illustrative, and no single feature or element is essential to all possible combinations that may be claimed in this or a later application.

What is claimed is:

1. A suspension restraint system for an All Terrain Vehicle comprising:
    a clamp fixed to at least one control arm of a suspension system, said clamp including a post;
    a rod mount fixed to a frame member;
    a rod configured to be secured to said rod mount, said rod including a hook, said hook being configured to engage said post of said clamp; and
    wherein said rod is configured to engage said clamp and restrain a movement of the suspension system when the suspension system is in a lowered position relative to said frame member.

2. The suspension restraint system as recited in claim 1, further including a spring, wherein said spring is secured between said rod mount and said rod to maintain said rod in a first position.

3. The suspension restraint system as recited in claim 1, wherein said clamp is fixed to an upper control arm.

4. The suspension restraint system as recited in claim 1, wherein said clamp is fixed to a lower control arm.

5. The suspension restraint system as recited in claim 1, wherein a position of said clamp may be varied about a length of said at least one control arm.

6. The suspension restraint system as recited in claim 1, wherein said clamp includes an upper block and a lower block, said upper block and said lower block configured to fit securely to said at least one control arm.

7. The suspension restraint system as recited in claim 1, further including a bar assembly.

8. The suspension restraint system as recited in claim 7, wherein at least one j-hook and at least one spring are secured to said bar assembly, wherein said at least one j-hook is configured to engage said at least one control arm to restrain the movement of the suspension system.

9. The suspension restraint system as recited in claim 8 wherein said spring is configured to bias said j-hook in a first position.

10. A suspension restraint system for an All Terrain Vehicle comprising:
    a clamp fixed to at least one control arm of a suspension system, said clamp including a post;
    a rod mount fixed to a frame member;
    a rod configured to be secured to said rod mount, said rod including a hook configured to engage said post;
    a spring secured between said rod mount and said rod to maintain said rod in a first position; and
    wherein said rod is configured to be rotated about said rod mount to a second position to engage said post of said clamp and restrain a movement of the suspension system when the suspension system is in a lowered position relative to said frame member.

11. The suspension restraint system as recited in claim 10, wherein said clamp is fixed to an upper control arm.

12. The suspension restraint system as recited in claim 10, wherein said clamp is fixed to a lower control arm.

13. The suspension restraint system as recited in claim 10, wherein a position of said clamp may be varied about said at least one control arm.

14. The suspension restraint system as recited in claim 10, wherein said clamp includes an upper block and a lower block, said upper block and said lower block configured to fit securely to said at least one control arm.

* * * * *